May 31, 1927.

H. L. RECKARD

COFFEE URN APPARATUS

Filed Aug. 1, 1923

INVENTOR
Henry L. Reckard
BY
Sewell Son
HIS ATTORNEYS

Patented May 31, 1927.

1,630,904

UNITED STATES PATENT OFFICE.

HENRY L. RECKARD, OF NEW YORK, N. Y., ASSIGNOR TO SLOSS PERFECT COFFEE MAKER, INC., OF NEW YORK, N. Y., A CORPORATION OF NEW YORK.

COFFEE-URN APPARATUS.

Application filed August 1, 1923. Serial No. 654,968.

This invention relates to a coffee urn apparatus and particularly to that type of apparatus for making coffee as usually employed in hotels, restaurants and similar places where coffee is made in large quantities or on a commercial scale. In this type of apparatus as heretofore constructed it has been customary to employ two or more coffee urns with intermediate heaters or boilers and suitable connections between the coffee urns and boilers at the upper portions thereof for transferring the necessary water from the intermediate heaters or boilers to the coffee urns in the process of making the coffee. Much difficulty has been heretofore experienced, however, with this arrangement due to the fact that the hot water as taken from the top of the heater or boiler is necessarily mixed with more or less steam making it impossible to determine exactly how much water is supplied to the coffee urn in any particular operation. As will be readily understood, in order to make the coffee satisfactorily there is a predetermined relationship between the quantity of water supplied and the amount of coffee employed. I am also aware that heretofore in various forms of apparatus for making coffee of the type to which this invention relates it has been customary to employ devices for transferring the coffee from the coffee receptacle to the coffee retainer to obviate the necessity of manually pouring and repouring the coffee in the operation of making the same. Now the object of my present invention is the provision of an apparatus in which the difficulties hereinbefore enumerated are overcome by employing an attachment associated with the devices for repouring the coffee, the parts being so constructed that the hot water is taken from the bottom of the heater or boiler instead of from the top thereof and a predetermined quantity thereof is transferred from the heater or boiler to the coffee urn by the devices for repouring the coffee and when the necessary or required amount of water has been transferred to the urn the repouring devices may be employed in the customary manner to prepare the beverage to the desired strength or in the manner required in any particular instance, as will be hereinafter more particularly described.

Figure 1:
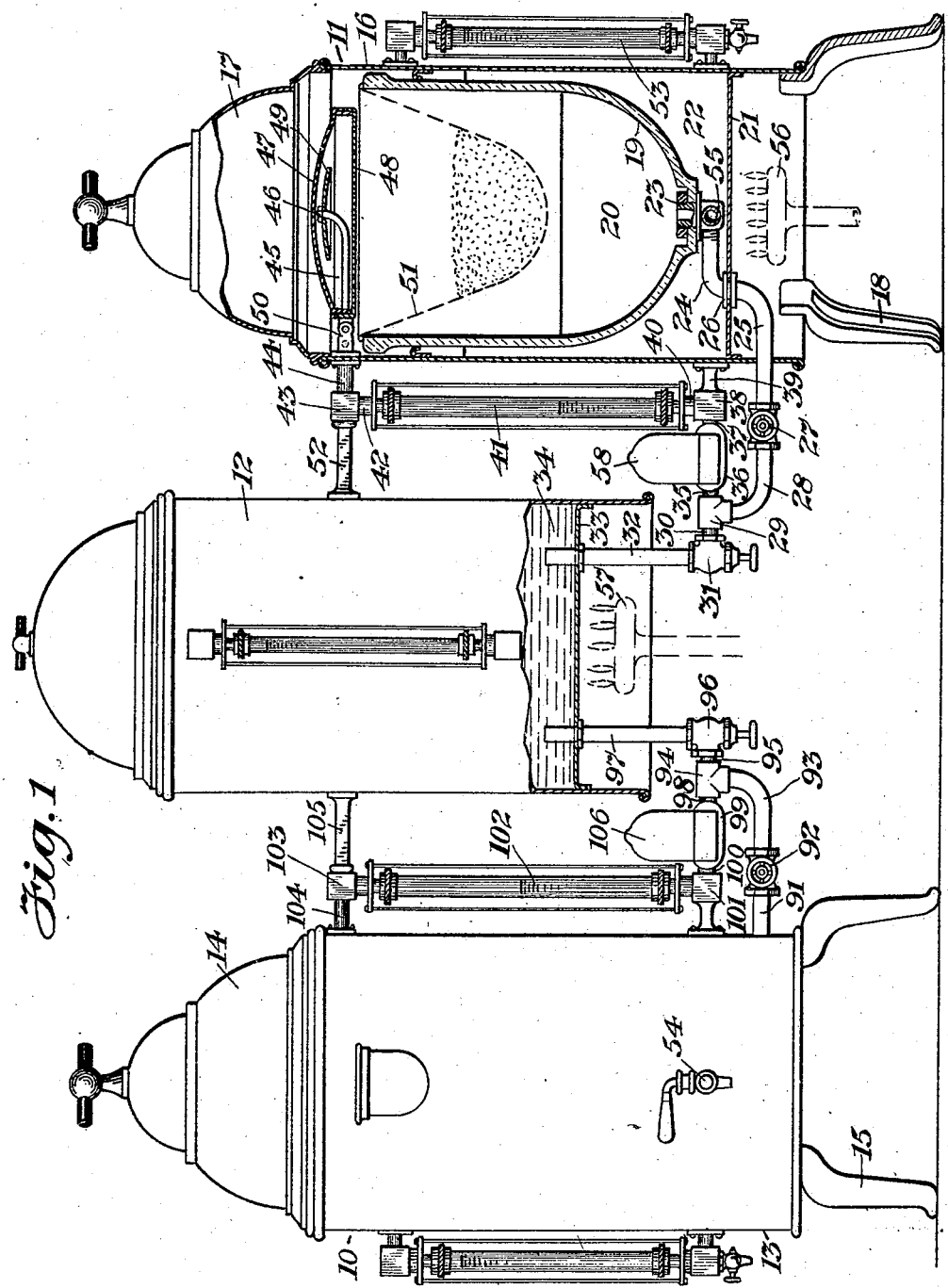
Fig. 1 is an elevation and partial vertical section illustrating a coffee urn apparatus made in accordance with my present invention.

By reference to the drawing it will be seen that the coffee urn apparatus made in accordance with this invention preferably comprises coffee urns designated by 10 and 11 and an intermediate boiler or heater indicated at 12. It will be understood, however, that this arrangement, namely the number of urns and the intermediate boiler is only illustrative as any number of urns with boilers or heaters intermediate of the same may be employed. The coffee urns are similarly constructed. In the drawing the outer casing of one of the coffee urns is indicated at 13 and this urn is fitted with a removable cover 14 and is suitably mounted on legs 15 or any desirable support. The other coffee urn as indicated in the drawing comprises an outer casing 16 fitted with a cover 17 and mounted upon legs 18.

Interiorly the coffee urns are provided with a coffee receptacle 19 providing a chamber 20 for the coffee. This coffee receptacle 19 is suitably spaced from the bottom wall 21 of the urn so as to provide a water chamber 22 between these parts and the outer casing of the urn. At the bottom of the coffee receptacle there is a pipe fitting 23 connected to which is a pipe 24 lying within the water chamber 22. On the other side of the bottom wall 21 there is a pipe 25. The pipes 24 and 25 are suitably connected to each other and to the bottom wall at an opening therein so as to make a continuous passage through these pipes from the coffee receptacle by way of the pipe fitting 23. The other end of the pipe 25 is connected to any suitable valve or cock 27 to which is also connected a pipe 28 leading to the leg of a T connection 29. Connected to one side of the T 29 is a pipe 30 leading to a valve 31 from which there is a pipe 32 leading to the bottom wall 33 of the heater or boiler 12 so as to make communication with the chamber 34 in the boiler. The other side of the T 29 is connected by a pipe 35 leading to the suction inlet of a pump 36. This pump may be of any desired type but is preferably of the same construction as is shown and described in Letters Patent No. 1,249,818, December 12, 1917. The discharge end of the pump 36 is connected by a pump 37 to an elbow 38 which is supported by a bracket 39 suitably connected to the outer casing of the urn 11. The outlet 40 from the elbow 38 is connected to the lower end of a gage glass 41 which at its upper end is similarly connected to the inlet 42 of an elbow 43. The outlet from the elbow 43 is connected to a pipe 44 which extends between the same and the outer casing of the urn 11. Interiorly of the urn the pipe 44 is connected to a jointed pipe 50 of the same construction as shown and described in Letters Patent No. 1,473,440, dated November 6, 1923. The hinged pipe joint 50 is connected to a pipe 45, the orifice of which is indicated at 46, terminates approximately centrally immediately below the cover member 47 of a distributor 48, and suitably secured to the upturned end of the pipe 45 there is a disk 49 for preventing the water as discharged from the pipe from dripping to the central portion of the distributor. In the use of this distributor the liquid as delivered from the pipe 45 is caused to flow over the inner surface of the cover 47 to the outer periphery of the distributor and thence inwardly toward the central portion of the distributor so as to provide an even distribution for the liquid as the same passes through the openings provided therefor in the bottom wall of the distributor to descend into the coffee bag 51 or other receptacle containing the ground coffee and suitably supported at the upper portion of the container 19. The elbow 43 and the pipe 44 may be also connected to the heater 42 by means of a bracket 52 extending between the shell of the heater and the elbow 43. This bracket, however, performs no function except that of a brace to assist in maintaining the parts in their proper positions in the apparatus.

Each coffee urn may also be fitted with a gage 53 to indicate the height of the water in the water chamber or compartment 22. In each coffee urn there is also a cock 54 which is connected to a pipe 55 extending from the lower portion of the fitting 23 and through the casing of the urn so that coffee may be withdrawn from the chamber 20 in the receptacle 19. Each coffee urn may also be provided with a gas burner 56 or other suitable devices for heating the same and in like manner the boiler 12 may be provided with a gas or other burner indicated at 57.

Figure 2:
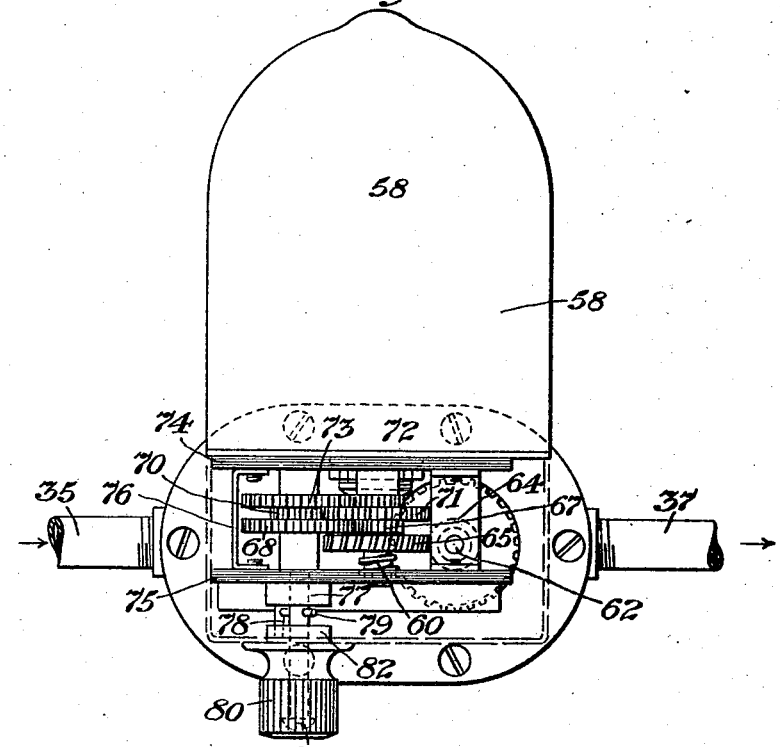
Fig. 2 is an elevation on an enlarged scale illustrating the pump and the switch device for controlling the motor to drive the pump for a predetermined period.
Figure 3:
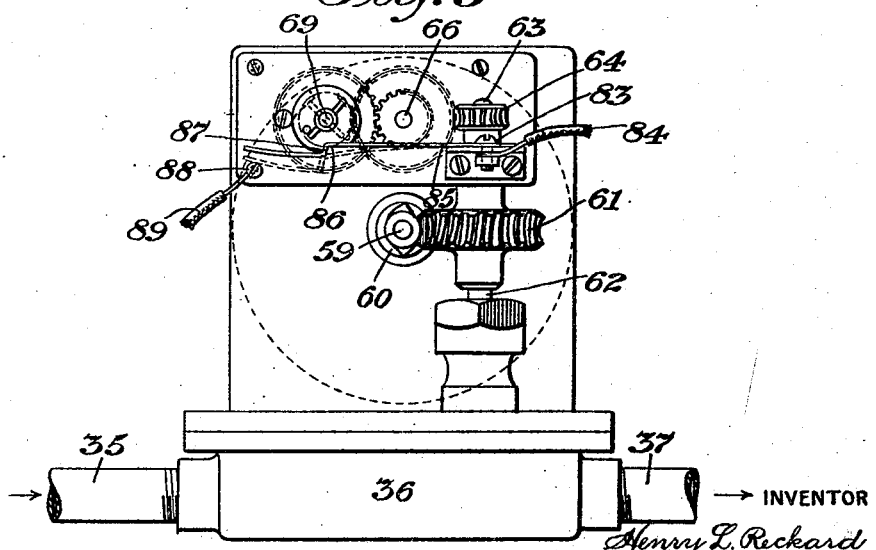
Fig. 3 is a plan of the parts shown in Fig. 2.

The motor by which the pump 36 is driven is indicated at 58. The motor shaft 59 is provided with a worm 60 meshing with a worm gear 61 mounted on the pump shaft 62 in order to drive the pump by the motor. The motor shaft is fitted with a continuation indicated at 63 and provided with a worm 64 which meshes with a gear 65 mounted freely on an auxiliary shaft 66. The gear 65 is connected to a pinion 67 which is also mounted freely on the auxiliary shaft and meshes with a gear 68 mounted freely on a switch shaft 69. Associated with the gear 68 is a pinion 70 meshing with a gear 71 also freely mounted on the auxiliary shaft 66. The gear 71 has associated therewith a pinion 72 which also turns freely on the shaft 66 and meshes with a gear 73 secured to the switch shaft 69. The auxiliary shaft 66 and the switch shaft 69 may be suitably journaled in spaced plates 74, 75 made of insulating or other similar material and connected and maintained in their relative positions by brackets 76 or otherwise. On the switch shaft 69 is a collar 77. This collar is mounted to turn freely on the shaft and is fitted with a pin 78 fixed in such a position as to be spaced from but substantially parallel to the switch shaft. The switch shaft is also provided with a pin 79 which extends transversely through the same and projects therefrom sufficiently far to contact with the pin 78. Exteriorly of a suitable casing which is shown in dotted lines in Fig. 2 the switch shaft is provided with a button 80 fitting over the end of the shaft and maintained in position thereon by a screw 81 or otherwise. The button 80 is provided with a boss 82 having an aperture therein for the reception of the outer end of the pin 78 so that the collar 77 may be turned a predetermined portion of a revolution by imparting a similar movement manually to the button 80.

The motor is suitably connected in a circuit provided with a switch for opening and closing the motor circuit to turn off or apply the power to the motor. The switch mechanism is associated with the switch shaft and the parts immediately hereinbefore described. One of the terminals of the switch is indicated at 83 and to this one of the lead wires 84 of the motor circuit is suitably connected. The switch includes a spring blade of suitable conductive material indicated at 85. One end of the spring blade 85 is connected to the terminal 83. In a suitable position the spring blade is provided with an angular bend 86 adapted normally to lie within an angular notch 87 provided therefor in the collar 77 so that the free end of the blade 85 is disconnected from the other motor terminal indicated at 88 and secured to which is a lead wire 89. These parts are so designed as to actuate the spring blade by a partial revolution of the collar 77 to cause the free end of the spring blade to contact with the switch terminal 88 to thereby close the circuit to the motor.

The switch mechanism hereinbefore described is the same as that illustrated and described in Letters Patent No. 1,482,581, dated February 5, 1924, and as will now be apparent the switch is in a normally opened position when the angular bend in the spring blade 85 lies within the angular notch in the collar 77. It will furthermore be apparent that by imparting a partial revolution to the collar 77 by turning the button 80 the spring blade will be moved to contact with the terminal 88 to close the motor circuit and irrespective of the amount to which the collar 77 is turned the motor circuit will be closed and subsequently after the motor is set in operation the switch shaft will be turned through the reduction gearing to cause the pin 79 to eventually contact with the pine 78 and to then continue the movement of the collar 77 until it has completed one revolution when the spring blade will automatically return to its normal position and open the motor circuit to stop the motor.

The parts of the apparatus and the manner of connecting the same between the boiler or heater 12 and the urn 10 are precisely similar to those hereinbefore described as connecting the boiler or heater 12 with the urn 11. These parts as shown in Fig. 1 of the drawing are briefly a pipe 91 leading from the receptacle for the coffee in the urn 10 and a valve 92 connecting the same to a pipe 93 and a T 94 which by the pipe 95 and valve 96 is connected by a pipe 97 to the bottom wall of the boiler or heater 12. The T 94 by a pipe 98 is connected to the suction inlet of a pump 99 and the discharge from the pump is connected by a pipe 100 to an elbow 101 secured to the lower end of a gage 102, the upper end of which is connected to an elbow 103 and by a pipe 104 to the interior of the urn. A bracket or brace 105 similar to the bracket 52 may be employed to complete the connection between the exterior or outer casings of the urn 10 and the boiler or heater 12. This bracket 105, however, performs no other function than that of a brace. The motor associated with the pump 99 is indicated at 106.

In the operation of this apparatus, assuming that the ground coffee has been placed in the container employed for this purpose and secured in position in the receptacle, and also that the water in the boiler or heater 12 has been raised to the desired temperature, the valve 27 is closed and the motor 58 is started by turning the button 80 a partial revolution. After the motor has turned the switch shaft one revolution it is automatically stopped, the parts are so designed that in this operation of the motor a predetermined quantity of water will be transferred by the pump from the boiler or heater through the pipe 32, the valve 31, the T 29, the elbow 38, the gage tube 41, the elbow 43, the pipe 44 and parts associated therewith to the distributor 48 from which the liquid will flow to and through the ground coffee in the coffee bag or other support, and thence to the chamber 20 in the receptacle 19. This operation may be repeated, depending upon the quantity of coffee employed to supply the necessary water in making the beverage. Then if it is necessary or desirable to repour the coffee the valve 31 is closed and the valve 27 is opened. Then by the operation of the motor one or any predetermined number of times the liquid in the receptacle 19 will be caused to flow through the pipes 24, 25, the valve 27, the pipe 28, the T 29, through the pump 36, the elbow 38, the gage glass T 41, the elbow 43 and the pipe and parts associated therewith to the interior of the urn. It will furthermore be understood that by drawing the water from the bottom of the boiler or heater it is possible by the operation of the pump to determine with sufficient exactness the quantity of water to be transferred to make certain of making the beverage of the desired consistency or strength.

I claim as my invention:

1. In a coffee urn apparatus and in combination with a coffee urn and an associated water heater, a coffee receptacle within the coffee urn, a pump, a connection from the coffee receptacle to the suction of the pump, a connection from the water heater to the suction of the pump, a connection from the discharge of the pump to the top of the coffee receptacle, and devices for actuating the pump whereby the pump is utilized to transfer a predetermined quantity of coffee from the coffee receptacle from the bottom to the top thereof and also to transfer a predetermined quantity of water from the lower end of the heater to the top of the coffee receptacle.

2. In a coffee urn apparatus and in combination with a coffee urn and an associated water heater, a pump, means for operating the pump, and connections from the lower end of the heater and from the lower end of the coffee urn to the pump suction and from the pump discharge to the upper portion of the urn for transferring a predetermined quantity of water from the heater to the top of the urn and also for circulating a predetermined quantity of coffee from the bottom to the top of the urn.

3. In a coffee urn apparatus and in combination with a coffee urn and an associated water heater, a pump, means for operating the pump for predetermined periods, and connections from the lower end of the water heater and from the lower portion of the coffee receptacle of the urn to the pump suction and from the pump discharge to the upper end of the coffee receptacle for transferring predetermined quantities of water from the heater to the upper portion of the coffee receptacle and also for circulating predetermined quantities of coffee from the bottom of the coffee receptacle to the top thereof.

4. In a coffee urn apparatus and in combination with a coffee urn and an associated water heater, a pump, a pipe connection from the lower end of the water heater to the suction of the pump, a pipe connection from the bottom of the urn to the suction of the pump, means for controlling the passage of a liquid through the said pipe connections, a pipe connection from the pump discharge to the upper portion of the urn, and means for operating the pump during predetermined periods for transferring a quantity of water from the lower end of the heater to the top of the urn and also for circulating a quantity of coffee from the bottom of the urn to the top thereof.

5. In a coffee urn apparatus and in combination with a coffee urn and an associated water heater, a coffee receptacle in the urn, a pump, a pipe line connection between the lower end of the water heater and the pump suction, a pipe line connection between the bottom of the coffee receptacle in the coffee urn and the pump suction, means for separately controlling the passage of a liquid through the said pipe line connections, a pipe line connection from the pump discharge to the upper portion of the coffee receptacle, and means for operating the pump predetermined intervals of time for transferring predetermined quantities of water from the lower end of the heater to the upper portion of the coffee receptacle and also for circulating predetermined quantities of coffee from the lower portion of the coffee receptacle to the upper portion thereof.

6. In a coffee urn apparatus and in combination with a coffee urn and an associated water heater, a coffee receptacle in the urn, means for withdrawing coffee from the coffee receptacle, a pump, a pipe line connection from the lower end of the heater to the pump suction, a valve in the said pipe line connection, a pipe line connection from the lower portion of the coffee receptacle to the pump suction, a valve in the last aforesaid pipe line connection, a pipe line connection including a gage tube from the pump discharge to the upper portion of the coffee receptacle, a motor for driving the said pump, and means for closing a circuit to the motor and automatically opening the circuit to stop the motor after the motor has run a predetermined period for operating the pump during said period to either transfer a predetermined quantity of water from the lower end of the heater to the upper portion of the coffee receptacle or to circulate a predetermined quantity of coffee from the lower portion of the coffee receptacle to the upper portion thereof.

Signed by me this 9th day of July, 1923.

HENRY L. RECKARD.